United States Patent [19]

Bannister, Jr. et al.

[11] Patent Number: 4,846,163

[45] Date of Patent: Jul. 11, 1989

[54] METHOD OF SEALING CAPACITOR BUSHINGS

[75] Inventors: James R. Bannister, Jr.; Julian W. Hall, Jr., both of Greenwood, S.C.; G. J. Rosenberger, Malvern, Pa.

[73] Assignee: Cooper Industries, Inc., Houston, Tex.

[21] Appl. No.: 88,732

[22] Filed: Aug. 24, 1987

[51] Int. Cl.⁴ .......................... B23K 1/20; H05K 5/06
[52] U.S. Cl. .............................. 128/124; 174/152 GM; 228/263.12; 427/404
[58] Field of Search .................. 228/121, 263.12, 124; 174/152 GM; 427/126.2, 404; 428/434; 252/514

[56] References Cited

U.S. PATENT DOCUMENTS

| | | | |
|---|---|---|---|
| 2,530,217 | 11/1950 | Bain et al. | 252/514 |
| 2,934,667 | 4/1960 | Pincus | 427/126.2 X |
| 3,429,736 | 2/1969 | Thompson et al. | 427/404 X |
| 3,649,567 | 3/1972 | Short | 252/514 |
| 3,827,891 | 8/1974 | Larry | 252/514 X |
| 4,101,710 | 7/1978 | Marcus | 252/514 X |

Primary Examiner—Kenneth J. Ramsey
Attorney, Agent, or Firm—Nelson A. Blish; Eddie E. Scott; Alan R. Thiele

[57] ABSTRACT

A method of bonding capacitor bushings (48) to tinned metal tank top covers (44) and tin plated terminal caps (42). A thick film ink is applied in two coats, the first coat (60) being high in binder and low in silver content and the second coat (62) being high in silver and low in binder, and fired. After burnishing, the bushing is soldered to the metal parts in a conventional manner.

11 Claims, 2 Drawing Sheets

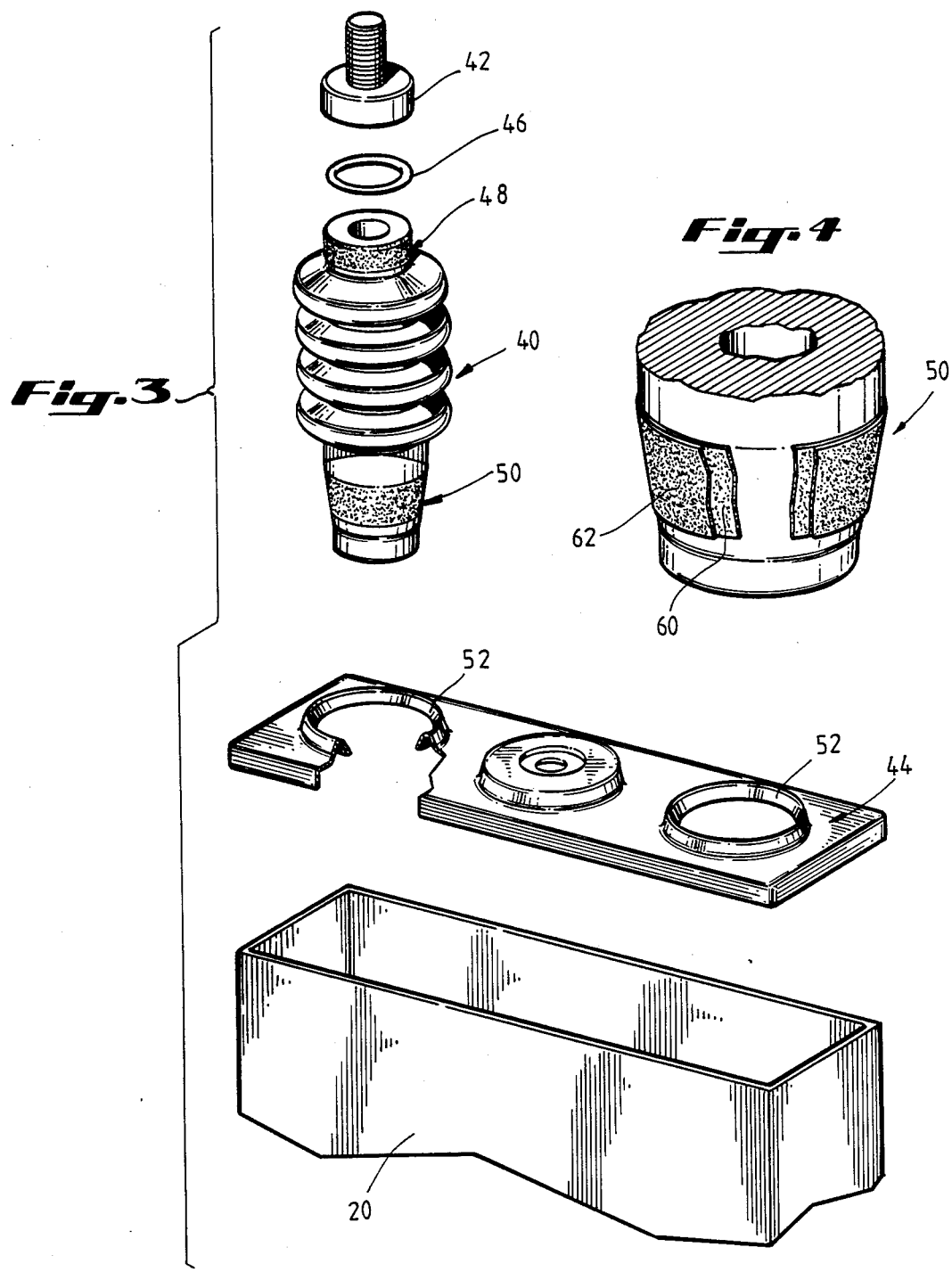

METHOD OF SEALING CAPACITOR BUSHINGS

BACKGROUND OF THE INVENTION

1. Field of the Invention

This invention relates in general to an improved capacitor bushing seal and more particularly to a method of preparing porcelain for soldering without electroplating.

2. Background

Capacitor bushings serve several functions. The primary function of the bushing is to isolate electrical leads from the metal body of the capacitor tank and from each other. The capacitor bushing is also used to isolate the contents on the inside of the capacitor from the outside environment. It is necessary to protect the internal capacitor components from contact with the exterior environment since contamination by moisture or dust may degrade the dielectric capacitor fluid and lead to capacitor failure. Also, the capacitor bushing seals the dielectric fluid inside and prevents it from escaping to the environment.

A problem is presented in joining the capacitor bushing, which is made of an insulating material such as porcelain, with the capacitor tank, which is usually stainless steel and the terminal cap which usually is a tinned metal such as brass or cooper. A traditional method used in bonding the porcelain bushing to the tank cap and terminal cap has been to solder the bushings to the metal parts.

Soldering the bushings using present technology involves a complicated procedure wherein two coats of a silver-based paint are applied, drying between each coat, fired, and then electroplated. Electroplating is a procedure wherein copper is plated onto the silver paint which has been heat fired into the porcelain. The plating process involves dipping the fired silver plated bushings in a dilute sulfuric acid bath, rinsing twice, then dipping the bushings in a nitric acid bath, rinsing again, dipping the bushings into a copper plating solution consisting of water, sulfuric acid and cupric sulphate and running current through the solution to deposit the copper. After being plated with copper, the bushing is subjected to two water rinses and then is plated with tin in a manner similar to the copper plating. This is followed by two more water rinses, a sodium carbonate rinse, a hot water rinse, drying, and finally, the soldering step. As may be seen, there are significant problems involved with the traditional electroplating process used to prepare bushings.

The most obvious problems are the complicated, time-consuming, labor intensive number of steps which are involved. Even more significant is the extra costs of materials such as the baths of sulfuric acid, nitric acid, copper-plating and tin-plating solution. Yet another problem is. These baths contain chemicals which are considered environmental contaminants and must be strictly accounted for when disposed of. Also, fumes from the baths require special venting which in itself requires additional construction maintenance costs since the corrosive fumes quickly degrade venting equipment.

Attempts to apply solder to insulating materials are shown in U.S. Pat. No. 4,101,710. However, prior art methods have dealt with providing an electrical solder connection between the thick film composition and other electronic parts and have not dealt with situations where metal and ceramic must be joined in a manner capable of withstanding pressure. See also U.S. Pat. No. 3,649,567 which discloses metallizing compositions applied to glass.

SUMMARY OF THE INVENTION

The procedure according to the present invention involves painting the area of the porcelain bushing to be bonded with a first coat high in frit and low in silver content for bonding to the porcelain, and painting a second coating on top of the first which is high in silver and low in frit which bonds to the prepared first coat and to which solder easily bonds. After coating, the bushing is fired under carefully controlled conditions to prevent cracking of the porcelain bushing and to assure adequate bonding of the thick film inks or coatings to the porcelain. The terminal cap and tank cover are ten soldered to the bushing by conventional means.

BRIEF DESCRIPTION OF THE DRAWINGS

FIG. 3 is an exploded view of a capacitor bushing, tank top, and terminal cap.

FIG. 4 is an enlarged view of a portion of the bushing with the layers of thick film ink partially cut away.

DETAILED DESCRIPTION OF THE PREFERRED EMBODIMENT

Figure 1:
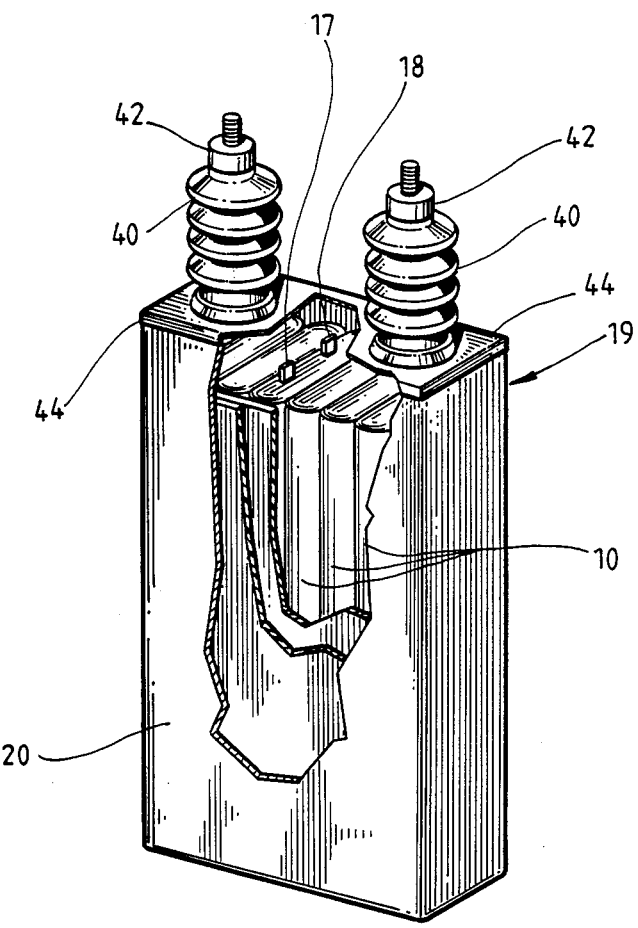
FIG. 1 is a perspective view of a capacitor partially cut away.

Referring now to FIG. 1 there is illustrated a capacitor 19 comprised of one or more capacitors rolls 10 in casing 20. The casing is filled with a dielectric fluid. Taps 17 and 18 from rolls 10 are joined together electrically to leads, not shown, passing through capacitor bushings 40 and terminal caps 42. Tap 17 and 18 may be eliminated in some methods of capacitor construction.

Capacitor rolls 10 includes a pair of spaced, metal foil electrodes and intermediate polypropylene film strips so that pairs of polypropylene film strips are found between foil electrode strips throughout the roll as is well known in the art. Tap straps 17 and 18 are inserted into the roll 10 to lie adjacent to the electrode strips to serve as electrical connections for the electrodes. Electrical leads connecting taps 17 and leading to external electrical connections at terminal caps 42 are electrically insulated from the metal casing 20 of capacitor 19.

A dielectric fluid such as, for example, isopropyl biphenyl, and phenyl xylylethane is used to impregnate capacitor 19. Typically, the dielectric films which comprise capacitor rolls 10 have been vacuum dried to remove water vapor and gas. The dielectric fluid also has been dried prior to impregnating of the capacitor.

In order to maintain capacitor 19 and the dielectric fluid free of water vapor and other impurities, the capacitor must be sealed. These capacitor seals must be able to withstand constant exposure to an environment which includes prolonged exposure to sunlight, extreme temperature variations, and exposure to the elements. In general, conditions such as may be found at the top of utility poles under all types of geographical conditions and meteorological conditions found throughout the world. Additionally, these capacitor seals must be capable of lasting for a useful life of approximately twenty years.

Figure 2:
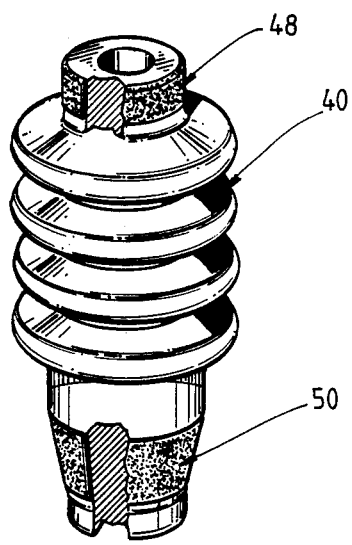
FIG. 2 is a perspective view of a capacitor bushing partially cut away.

Sealing capacitor 19 is difficult since capacitor bushing 40 is comprised of porcelain or other insulating material. Insulating material is not readily joined to metal parts such as the metal casing 20 and terminal cap 42. As shown in FIGS. 2 and 3, the capacitor bushing 40 must be sealed at two places, the top end 48 of the bushing 40 where it connects with terminal cap 42 and the lower end 50 of bushing 50 where it connects with tank cover 44 through opening 52. O-ring 46 provides an additional seal between terminal cap 42 and bushing 40.

The most effective means of joining bushing 40 to the metal parts, terminal cap 42 and tank cover 44, has been to solder these parts. Preparing bushing 40 for the soldering process, according to the present invention, substantially decreases material and labor costs associated with manufacturing capacitors.

To prepare the bushing 40 to receive solder, a two-step paint process is used at the top end 48 and the lower end 50 of bushing 40. A thick film ink or coating is painted onto bushing 40 as it is rotated and allowed to dry. See FIG. 4. After the thick film ink has dried, a second coat of a different composition is applied on top of the first coat and allowed to dry.

The thick film ink consists of three primary components, the vehicle, the metallic part, and the binder. The first or prime coat contains a relatively high binder content and must create the required high strength bond to the porcelain ceramic. The second or top coat must bond to the prime coat and must function as the solder base for sealing.

The composition of each of the two coats of layers varies as the required function. Both contain silver in the form of amorphous precipitated powder and milled fine platelets of flake in the 1–10 micron size range. Also, both contain an organic vehicle consisting of polymer resins, solvents, and dispersing agents similar to an oil based commercial paint. The vehicle must have the correct rheological properties to provide a smooth film without pinholes when fired. The ceramic binder in the paint forms the active phase for sealing. Both mixtures contain similar glass frits and oxides. These glass frits and oxides are made in the form of the prior art by forming amorphous culette by rapid quenching a molten glass mixture and grinding these to a fine powder of 1–2 micron particle size.

TABLE 1

| Vehicle Typical Composition | |
|---|---|
| Polymer Resin | 10–15 |
| Solvents | balance |
| Dispersing Agents | 1–5 |

The first coat of thick film ink is comprised of a high binder, low silver composition that shows good properties for bonding to porcelain. A typical composition of the first coat is shown in Table 2.

TABLE 2

| Silver | 58–62% |
|---|---|
| Binder Phase | 5–10% |
| Vehicle | Balance |

The prime coat is painted and dried and, a second coat is applied in the same manner. The second coat is high in silver and low in binder and readily bonds to both the first coat to solder which is applied at a later step. A typical composition for the second coat is shown in Table 3.

TABLE 3

| Silver | 62–70% |
|---|---|
| Binder Phase | 1–6% |
| Vehicle | Balance |

After the second coat has dried, the capacitor bushings are fired. The firing process is designed so that there will be bonding on a molecular level between the first coat and the porcelain, and between the first and second coat. Also, the temperature and the increase in temperature is designed so that the relatively brittle porcelain bushing will not crack during the heating and cooling process. Typical heating temperatures, rate of temperature increase and cooling rates are shown in Table 4. These times are considered minimum times and rate of temperature increase may be slower and the time at which the bushings are maintained at a specific temperature may be longer.

TABLE 4

| A. | Loading | |
|---|---|---|
| | 1. Region 0 | Loading region will soak at 200° F. |
| B. | Heating Up | |
| | 2. Region 1 | Ramps to 700° F. in 1 hr. |
| | 3. Region 2 | Soaks at 700° F. for 30 min. |
| | 4. Region 3 | Ramps to 1100° F. in 1 hr. 45 min. |
| | 5. Region 4 | Soak at 1100° F. for 30 min. |
| | 6. Region 5 | Ramps to 1320° F. in 50 min. |
| | 7. Region 6 | Soaks at 1320° F. in 40 min. |
| C. | Cooling | |
| | 8. Region 7 | Ramps down to 700° F. in 6 hrs. 30 min. |
| D. | Unloading | |
| | 9. Region 8 | Soaks at 200° F. |

After the bushing has cooled to near ambient temperature, the coated top 48 and lower coated end 50 of bushing 40 are lightly burnished. They are then coated with flux and soldered in a normal manner. The resulting fired film is a bright silver, dense, adherent layer securely bound to the body of the applied area of approximately 0.0015 to 0.002 inches (0.04 to 0.05 mm) thickness. This ceramic-metal (cermet) film has a composite thermal coefficient of expansion and sufficient maleability that allows it to expand and contract with the porcelain substrate uniformly. The film is readily wetted by tin-lead or tin-lead-silver solders using standard processing techniques.

Typically, terminal cap 42 is manufactured with brass that is tin-plated. The solder used both on the terminal cap 42, and on the metal stainless steel tank cover 44 which is tinned, is a 50—50 tin lead solder. Prior to soldering terminal cap 42, o-ring 46 is inserted into cap 42 to provide additional sealing ability. O-ring 46 also provides some resiliency between bushing 40 which is somewhat brittle and external connections to terminal cap 42. In the usual procedure, terminal cap 42 is soldered to bushing 40 first and then bushing 40 is soldered to tank cover 44 at opening 52, although this order could be easily reversed. Optimum bond strengths are obtained if solder temperatures are in the 210°–230° C. range.

Testing of the bushings prepared in accordance with the present invention has shown a marked improvement in several critical tests. For example, in a test called a push test a bushing, with cover plate attached, is inverted over a pipe and hydraulically forced out of the stainless steel cover. Using a 5" diameter cylinder, the hydraulic pressure for the push test using a capacitor soldered to a tank top by the present method has been approximately 6000 pounds or 310 psi. Prior push test results using capacitor bushings prepared with the electroplating method prevalent in industry, have required hydraulic pressure of about 4000 pounds, or about 225 psi, to dislodge the bushing from the cover. This shows a significant increase in bonding strength of the bushing.

Another significant improvement in the present invention over the prior art is the improvement in leak rates, which has improved to about 0.1% of production. By comparison, using the existing technology, the leak rates for the parts ran at about 1.0%. Thus, a considerable improvement in the reject level and necessary rework is realized.

Savings achieved in material and labor in producing capacitors according to the present invention have been significant. The manufacturing costs associated with capacitors produced using bushings prepared according to the present invention are approximately 40% less than the manufacturing costs associated with capacitors with bushings prepared by the electroplating method. Most of this saving has been in costs of materials. Another advantage has been eliminating environmentally sensitive materials from the manufacturing process.

We claim:
1. A method of soldering capacitor bushings to metal parts comprising the steps of:
   applying a first coat of thick film ink to said bushing;
   drying said first coat;
   applying a second coat of thick film ink on top of said first coat;
   drying said second coat;
   firing said bushing; and
   soldering said bushing.
2. A method of bonding as in claim 1 wherein said ink is comprised of:
   a metal phase;
   a binder phase; and
   a vehicle.
3. A method of bonding as in claim 2 wherein said metal phase is selected from a group comprised of:
   silver, palladium, or platinum.
4. A method of bonding as in claim 2 wherein said binder phase is comprised of:
   45 to 50% oxide;
   24 to 30% silicon oxide;
   10 to 15% boric oxide;
   1 to 3% aluminum oxide;
   3 to 6% titanium oxide;
   1 to 3% sodium oxide;
   1 to 4% cadmium oxide;
   1 to 4% zinc oxide; and
   5 to 20% bismuth oxide.
5. A method of soldering bushings as in claim 1 wherein said first coat has a silver content of 58-62%.
6. A method of soldering bushings as in claim 1 wherein said second coat has a silver content of 62-70%.
7. A method of bonding insulating material, selected from a group comprised of glass or ceramic, to metal comprising the steps of:
   applying a first coat of thick film ink to said insulating material;
   drying said first coat;
   applying a second coat of thick film ink on top of said first coat;
   drying said second coat;
   firing said insulating material; and
   joining said second coat to said metal.
8. A method of bonding as in claim 7 wherein said joining is by soldering.
9. A method of bonding as in claim 7 wherein said joining is by brazing.
10. A method of bonding as in claim 7 wherein said first coat is comprised of:
    58 to 62% silver;
    5 to 10% binder phase; and
    the balance vehicle.
11. A method of bonding as in claim 7 wherein said second coat is comprised of:
    62 to 70% silver;
    1 to 6% binder phase; and
    the balance vehicle.

* * * * *